United States Patent
Pascoe et al.

(10) Patent No.: US 10,576,315 B2
(45) Date of Patent: Mar. 3, 2020

(54) ANCHOR, INDICATOR, ANCHOR ASSEMBLY AND FALL ARREST SYSTEM

(71) Applicant: LIFEPOINT INTERNATIONAL PTY. LIMITED, Thornton (AU)

(72) Inventors: Andrew John Pascoe, Kensington (AU); Paul David Barwick, Nelson Bay (AU)

(73) Assignee: LIFEPOINT INTERNATIONAL PTY. LIMITED, Thornton (AU)

( * ) Notice: Subject to any disclaimer, the term of this patent is extended or adjusted under 35 U.S.C. 154(b) by 10 days.

(21) Appl. No.: 15/572,314

(22) PCT Filed: Mar. 3, 2016

(86) PCT No.: PCT/AU2016/050145
§ 371 (c)(1),
(2) Date: Nov. 7, 2017

(87) PCT Pub. No.: WO2016/179641
PCT Pub. Date: Nov. 17, 2016

(65) Prior Publication Data
US 2018/0117374 A1    May 3, 2018

(30) Foreign Application Priority Data

May 14, 2015 (AU) .................................. 2015901747
Oct. 20, 2015 (AU) .................................. 2015904292

(51) Int. Cl.
*F16B 13/12* (2006.01)
*A62B 35/00* (2006.01)
(Continued)

(52) U.S. Cl.
CPC .......... *A62B 35/0068* (2013.01); *A62B 35/04* (2013.01); *F16B 13/124* (2013.01);
(Continued)

(58) Field of Classification Search
USPC ............................ 248/542; 405/259.1–259.6
See application file for complete search history.

(56) References Cited

U.S. PATENT DOCUMENTS 3,408,780 A  *  11/1968  Brister ...................... E04D 1/30
248/237
4,889,457 A     12/1989  Hageman
(Continued)

FOREIGN PATENT DOCUMENTS

WO     2003/033877     4/2003

OTHER PUBLICATIONS

Official Communication issued in International Patent Application No. PCT/AU2016/050145, dated Jul. 5, 2016.

*Primary Examiner* — Monica E Millner
(74) *Attorney, Agent, or Firm* — Rankin, Hill & Clark LLP (57) ABSTRACT

There is disclosed an anchor assembly for coupling a tether to a structure such as a rock wall (14) in a fitted condition with a fastening arrangement having a fastener. The anchor assembly includes an anchor body having a first portion located toward a first end adapted to couple with the tether and a second portion located toward a second end. The second portion is adapted to receive the fastener in the fitted condition. The anchor assembly also includes an indicator arranged to be engagable in the fitted condition between the fastening arrangement and the anchor body. The indicator includes a body portion and a deformable portion extending from the body portion, the deformable portion being adapted to be moveable relative to the body portion between an initial non-deformed condition and a deformed condition in response to loading of the fastening arrangement.

16 Claims, 8 Drawing Sheets

(51) Int. Cl.
    *A62B 35/04*     (2006.01)
    *F16B 31/02*     (2006.01)
    *F16B 43/02*     (2006.01)
    *F16B 45/02*     (2006.01)
    *F16B 45/00*     (2006.01)

(52) U.S. Cl.
    CPC ............ *F16B 31/028* (2013.01); *F16B 43/02* (2013.01); *F16B 45/00* (2013.01); *F16B 45/02* (2013.01)

(56) References Cited

U.S. PATENT DOCUMENTS

| | | | |
|---|---|---|---|
| 5,556,234 A | 9/1996 | Oldsen et al. | |
| 5,618,143 A * | 4/1997 | Cronin, II | B25B 13/48 |
| | | | 411/120 |
| 5,674,034 A * | 10/1997 | Bennett | F16B 39/10 |
| | | | 411/120 |
| 5,967,722 A * | 10/1999 | Fett | F16B 39/10 |
| | | | 411/120 |
| 6,244,804 B1 | 6/2001 | Hodge | |
| 8,151,522 B2 * | 4/2012 | Stearns | E04D 13/10 |
| | | | 52/58 |
| 8,387,752 B2 * | 3/2013 | Lagerstedt | A62B 1/04 |
| | | | 182/87 |
| 8,453,794 B2 | 6/2013 | Melic | |
| 8,894,329 B1 | 11/2014 | Kekahuna et al. | |
| 2009/0060674 A1 * | 3/2009 | Kluga | B21D 53/20 |
| | | | 411/149 |
| 2016/0245341 A1 * | 8/2016 | Thomas | F16C 35/02 |

\* cited by examiner

ANCHOR, INDICATOR, ANCHOR ASSEMBLY AND FALL ARREST SYSTEM

RELATED APPLICATIONS

This application claims priority from Australian provisional patent applications Nos. 2015901747 & 2015904292 filed on 14 May 2015 & 20 Oct. 2015, respectively, the contents of which are incorporated herein by reference.

TECHNICAL FIELD

The invention relates to an anchor, an indicator for an anchor and an anchor assembly for inhibiting falls. The invention also relates to a fall arrest system including an anchor assembly.

BACKGROUND

In mining, construction and other applications there are situations where a person is required to be working at heights or in situations where they need to be tethered to an attachment point for safety reasons. Typically, the person is required to wear personal protective or safety equipment or the like that may include a body harness and a tether connectable to the attachment point.

Presently, persons are attaching their personal protective equipment to attachment points or structures intended for other purposes. For example, persons may be suspending themselves from a conveyor or a beam of a mine roof, which may result in these structures becoming overstressed and potentially lead to failure.

In particular, in some applications the attachment points or structures may be attached to or form part of supporting a wall or roof such as a retaining wall, rock wall or mineshaft roof and it is difficult to determine if the attachment points or structures are adequately supported by the underlying supporting wall or roof.

In addition, these attachment points or structures may not be part of regular safety checks to ensure that they are fit for purpose and do not typically include any indication that the attachment points or structures are fit for purpose and that safety checks have been carried out.

The invention disclosed herein seeks to overcome one or more of the above identified problems or at least provide a useful alternative.

SUMMARY

In accordance with a first main aspect there is provided, an anchor assembly for coupling a tether to a structure in a fitted condition with a fastening arrangement having a fastener, the anchor assembly including: an anchor body having a first portion located toward a first end adapted to couple with the tether and a second portion located toward a second end, the second portion being adapted to receive the fastener in the fitted condition; and an indicator arranged to be engagable in the fitted condition between the fastening arrangement and the anchor body, the indicator including a body portion and a deformable portion extending from the body portion, the deformable portion being adapted to be moveable relative to the body portion between an initial non-deformed condition and a deformed condition in response to loading of the fastening arrangement, wherein the second portion of the anchor body includes a recess in which the body portion of the indicator is at least partially receivable in the deformed condition and a bearing surface offset relative to the recess so as to be engagable with the deformable portion of the indicator as the body portion is moved into the recess in the fitted condition thereby moving the deformable portion to the deformed condition.

In an aspect, the recess includes a seating surface recessed relative to the bearing surface against which the body portion of the indicator is engagable in the fitted condition, and wherein the bearing surface is elevated relative to the seating surface.

In another aspect, the anchor body includes an aperture adapted to receive the fastener and the recess at least partially skirts the aperture.

In yet another aspect, the recess includes a recessed ledge that substantially skirts the aperture, the seating surface being provided by a top surface of the ledge.

In yet another aspect, the bearing surface is provided by a rim section of the second portion that at least partially skirts the recess.

In yet another aspect, the rim section is adapted to locate the indicator in at least one of the initially non-deformed and deformed conditions.

In yet another aspect, the rim section is adapted to inhibit rotation of the indicator in at least one of the initially non-deformed and deformed conditions.

In yet another aspect, the rim section is arranged to receive the deformable portion of the indicator thereby locating the indicator in the fitted condition, the bearing surface thereby being provided by a recessed surface of the rim section.

In yet another aspect, the rim section includes at least one notch adapted to fit with and receive the deformable portion of the indicator.

In yet another aspect, the recess is dimensioned to provide a gap between the body portion and a skirting wall of the recess, the gap enabling the upturned deformed portions to extend from the body portion in the deformed condition.

In yet another aspect, the body portion of the indicator includes an aperture arranged to substantially concentrically align with the aperture of the second portion in the fitted condition.

In yet another aspect, the recess is annular in shape and the body portion of the indicator is correspondingly annular in shape so as to be receivable thereby, wherein the aperture of the body portion is located centrally of the body portion and the deformable portion extends radially of the body portion so as to be engagable with the rim portion.

In another aspect, the deformable portion is provided in the form of a plurality of deformable tabs extending radially of the body portion.

In yet another aspect, bases of the deformable tabs are located radially inwardly relative to an outer diameter of the body portion of the indicator.

In yet another aspect, the fastening arrangement includes a nut arranged to advance on the fastener, and wherein the body portion of the indicator includes a bearing surface skirting the aperture arranged to be urged, either directly or indirectly, by the nut.

In yet another aspect, the recess is arranged to receive the nut in the fitted condition with the plurality of deformable tabs extending radially beyond the nut.

In yet another aspect, the deformable portion is arranged to deform at a pre-determined load applied to the fastening arrangement thereby indicating the anchor assembly as being fit for use.

In yet another aspect, the anchor assembly further includes the fastening arrangement.

In accordance with a second main aspect there is provided, an anchor system including an anchor assembly as described above, the system including one or more anchor bodies having a colour code to indicate at least one of a load rating and an instalment time period of the anchor body, and one or more indicators including an further colour code to indicate at least one of a further load rating and a further instalment time period for the indicator.

In accordance with a third main aspect there is provided, An anchor body for coupling a tether to a structure using a fastening arrangement and an indicator having a body portion and a deformable portion, the anchor body including: a first portion adapted to couple with the tether; and a second portion including an aperture arranged to receive a fastener of the fastening arrangement to couple with the structure in a fitted condition, a recess at least partially skirting the aperture and an bearing surface arranged adjacent to and elevated relative to the recess, wherein the recess is dimensioned to receive the body portion of the indicator and wherein the bearing surface arranged to be engagable with the deformable portion of the indicator such that the deformable portion is moved to the deformed condition as the body portion is moved into the recess in the fitted condition.

In an aspect, the recess includes a seating surface, recessed relative to the bearing surface, against which the body portion of the indicator is engagable in the fitted condition.

In another aspect, the recess includes a recessed ledge that substantially skirts the aperture, the seating surface being provided by a top surface of the ledge.

In yet another aspect, the bearing surface is provided by a rim section of the second portion that at least partially skirts the recess.

In yet another aspect, the rim section is adapted to locate the indicator in at least one of the initially non-deformed and deformed conditions.

In accordance with a fourth main aspect there is provided, load indicator for use in an anchor assembly having an anchor body and a fastening arrangement for securing the anchor assembly to a structure in a fitted condition, the load indicator having a body portion having an aperture through which a fastener of the fastening arrangement passes in the fitted condition and a deformable portion extending laterally from the body portion, wherein the body portion is dimensioned to be receivable by a recess of the anchor body and the deformable portion is arranged to be engagable with an bearing surface of the anchor body at least partially skirting and elevated relative to the recess such that, in the fitted condition, the deformable portion move to a deformed condition in response to a pre-determined load applied to the fastening arrangement thereby indicating the anchor assembly is secured to the structure.

In an aspect, the body portion of the indicator is annular in shape with the aperture being located centrally thereof.

In another aspect, the deformable portion is provided in the form of a plurality of deformable tabs extending radially of the body portion.

In yet another aspect, bases of the deformable tabs are located radially inwardly relative to an outer diameter of the body portion of the indicator.

In yet another aspect, bases of the deformable tabs are narrower relative to free end tips of the deformable tabs.

In yet another aspect, at least the body portion is relatively flat so as to provide a washer between a nut of the fastening arrangement and the anchor body.

In yet another aspect, the fastening arrangement includes a nut arranged to advance on the fastener, and wherein the body portion of the indicator includes a bearing surface skirting the aperture arranged to be urged, either directly or indirectly, by the nut.

In accordance with a fifth main aspect there is provided, method of determining the fit for purpose of an anchor assembly, the method including the steps of: (a) Fitting an anchor body of the anchor assembly to a structure with a fastening arrangement such that a fastener of the fastening arrangement passes through an aperture of the anchor body; (b) Locating an indicator so as to be engageable between a nut of the fastening arrangement and the anchor body with a body portion of the indicator located proximate a recess of the anchor body that at least partially skirts the aperture and with a deformable portion of the indicator extending laterally of the recess away from the aperture; (c) Actuating the nut of the fastening arrangement so as to bear on the body portion of indicator such that the body portion is urged into the recess and the deformable portion of the indicator bears on an bearing surface at least partially skirting and elevated relative to the recess such that the deformed portion is moved to a deformed condition thereby indicating the anchor assembly is fit for purpose.

In an aspect, the step of locating the indictor includes passing the fastener through an aperture of the body portion of the indictor.

In another aspect, the locating the indictor includes orientating the deformable portion with a locator of the bearing surface.

In yet another aspect, at least one of the anchor body and indicator include a colour code and the method includes the step of: visually inspecting the anchor assembly to determine if the colour code is associated with at least one of load to be applied and a valid period of use.

In accordance with a sixth main aspect there is provided, anchor assembly for coupling a tether to a structure in a coupled condition, the anchor assembly including: a fastening arrangement including a fastener; an anchor body having a first portion adapted to couple with the tether and a second portion, the second portion being arranged to at least partially receive the fastener so as to allow coupling of the second portion and the structure in the coupled condition; and an indicator arranged to be engagable in the coupled condition between the fastening arrangement and the anchor body, the indicator including a body portion and a deformable portion extending laterally of the body portion, the deformable portion being adapted to be moveable relative to the body portion between an initial non-deformed condition and a deformed condition in response to loading of the fastening arrangement in the coupled condition; and wherein the second portion of the anchor body includes a first surface toward which the body portion of the indicator is movable and a second surface arranged to be engagable with the deformable portion of the indicator, the first surface being offset relative to the second surface such that the deformable portion is moved to the deformed condition as the body portion is moved toward the first surface.

In an aspect, the second portion of the anchor body includes an aperture at least partially skirted by a recess, the recess being dimensioned to at least partially receive the body portion in the deformed condition, wherein the first surface is provided by a recessed ledge of the recess and the second surface is provided by a rim section of the second portion adjacent to and elevated relative to the recessed ledge.

BRIEF DESCRIPTION OF THE FIGURES

The invention is described, by way of non-limiting example only, by reference to the accompanying figures, in which.

DETAILED DESCRIPTION

Figure 1:
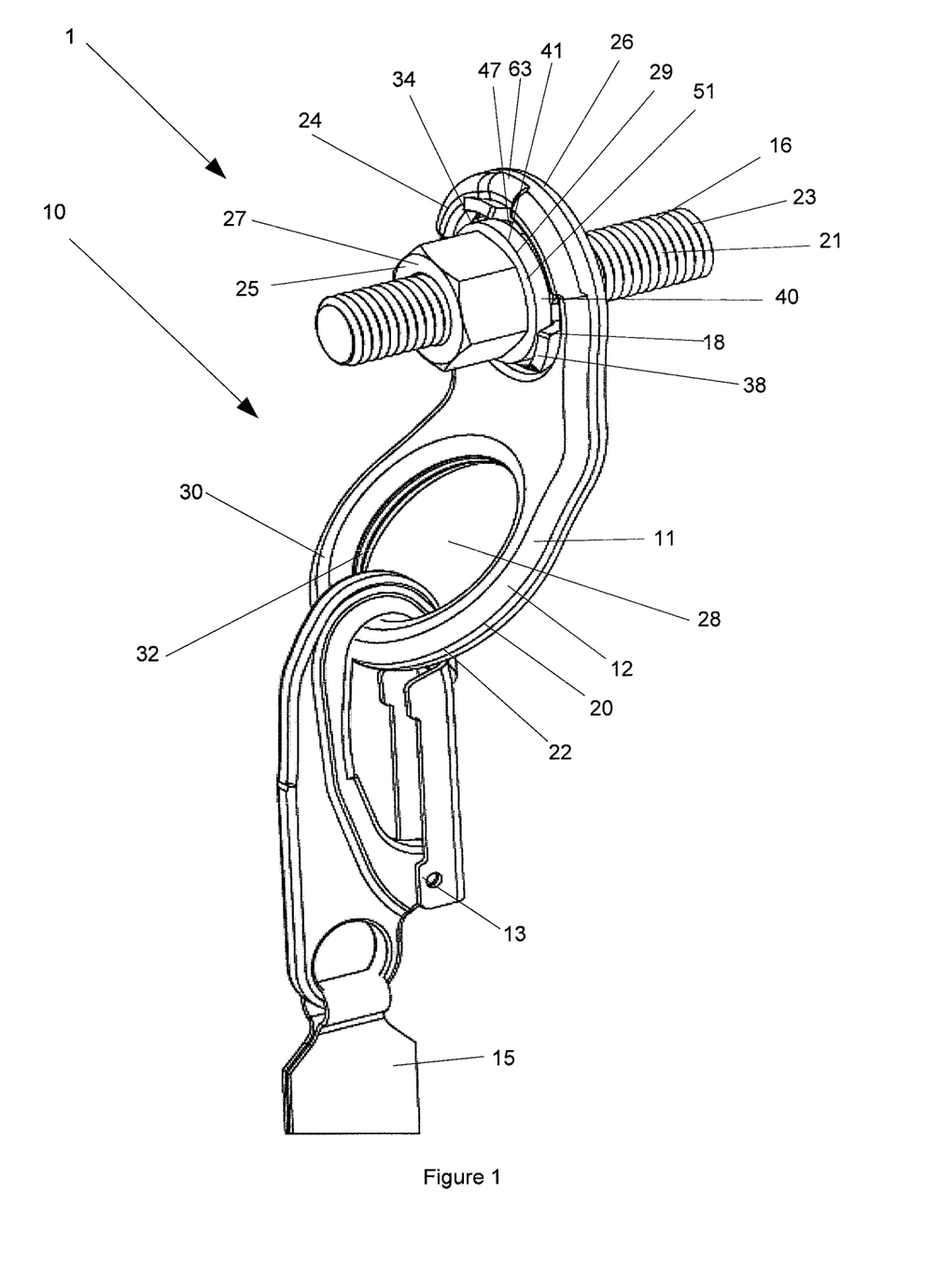
FIG. 1 is a perspective front view illustrating an anchor assembly having an anchor, a fastening arrangement and a carabiner coupled to the anchor.
Figure 2A:
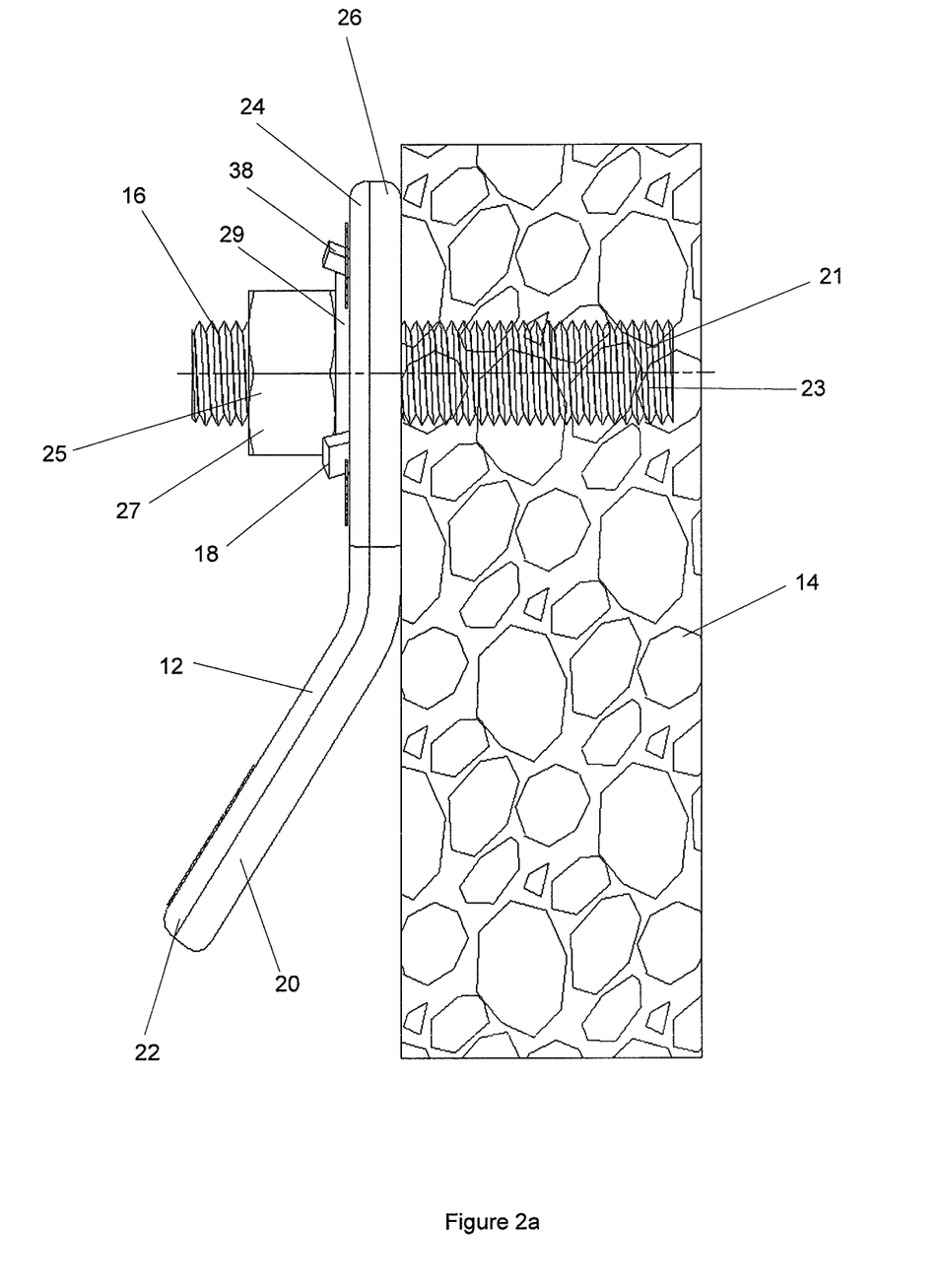
FIG. 2a is a side view illustrating the anchor assembly coupled to a structure via the fastening arrangement.
Figure 2B:
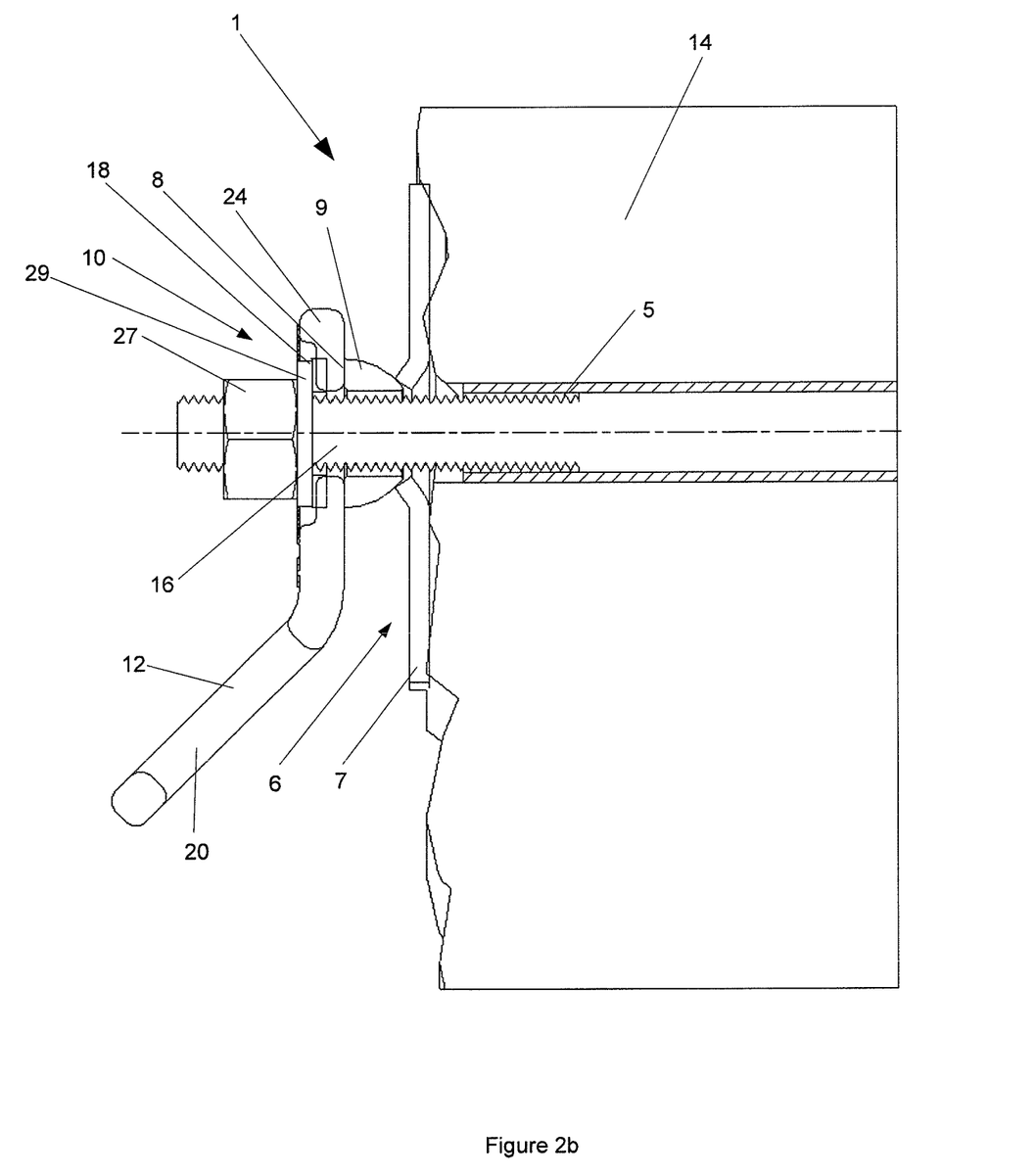
FIG. 2b is a side sectional view illustrating the anchor assembly coupled to a rock wall via the fastening arrangement and further including a rock bolt plate and a dome washer.

Referring to FIGS. 1 and 2a, there is shown an anchor or fall arrest system 1 including an anchor assembly 10 for coupling a tether 15 such as a rope or strap connected to a carabiner 13 or other similar coupling (shown in FIG. 1) to a structure such as a rock structure 14 (shown in FIG. 2a or FIG. 2b). The tether 15 is then typically connected to personal protective equipment (not shown), such as a harness, to secure the person to the rock structure 14 via the anchor assembly 10.

The anchor assembly 10 includes an anchor 11 having an anchor body 12, a fastening arrangement 16 and an indicator 18. The anchor body 12 includes a first portion 20 located toward a first end 22 adapted to couple with the tether 15 and a second portion 24 located toward a second end 26 arranged to be coupled to the structure 14 with the fastening arrangement 16.

The indicator 18 is operatively associated with the fastening arrangement 16 and the anchor body 12 for indicating if the anchor assembly 10 is fit for use, as will be further detailed below. The fastening arrangement 16 includes a fastener 21, provided in the form of a threaded bolt 23, and a securing part 25 in the form of a nut 27 arranged to be actuated to advance on the threaded bolt 23 and a standard washer 29, through which the bolt 23 passes, located to bear on the indicator 18 in a fitted condition.

Figure 2C:
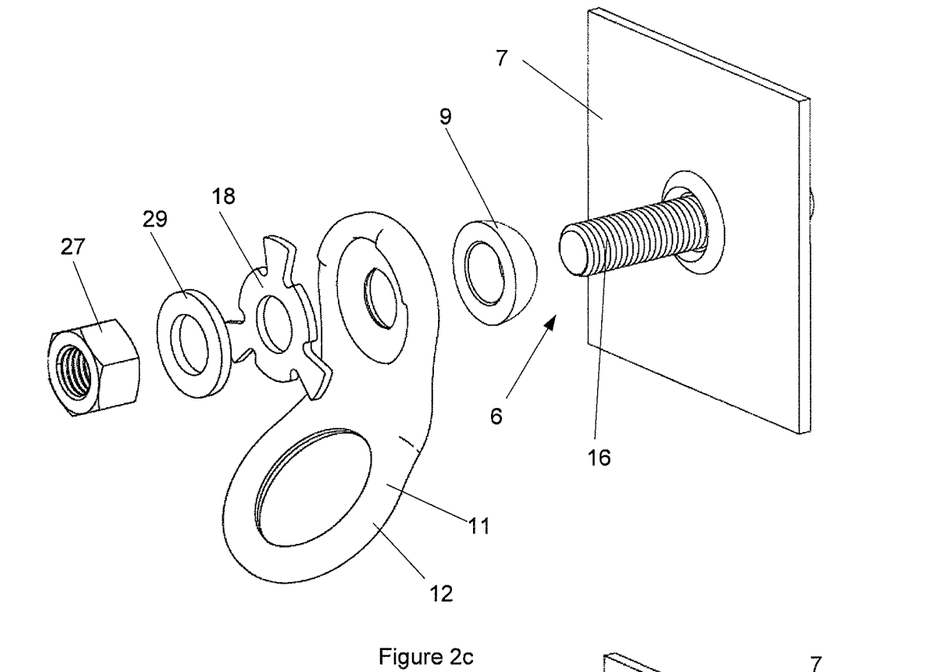
FIG. 2c is an exploded parts view of the anchor assembly, fastening arrangement, rock bolt plate and the dome washer.
Figure 2D:
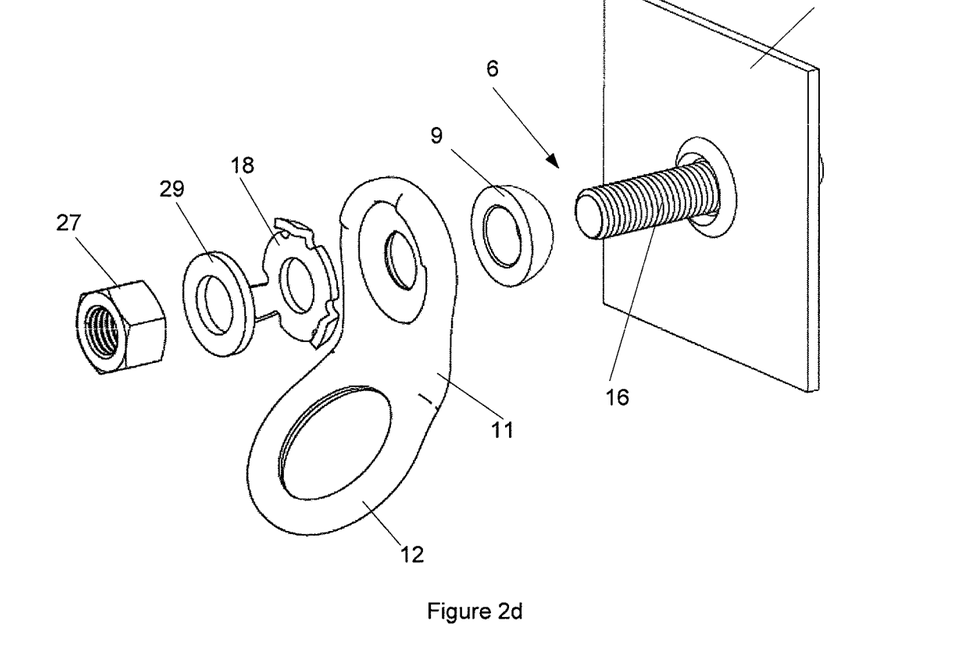
FIG. 2d is a exploded parts view of the anchor assembly, fastening arrangement, rock bolt plate and the dome washer, with the load indicating washer being shown in a deformed condition.
Figure 3:
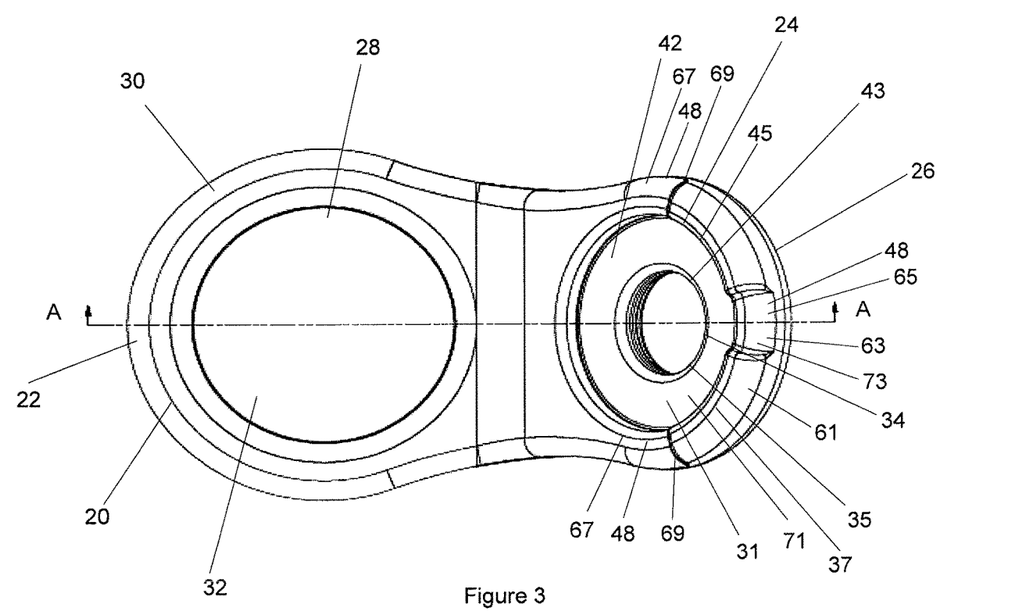
FIG. 3 is a top view illustrating the anchor.
Figure 4:
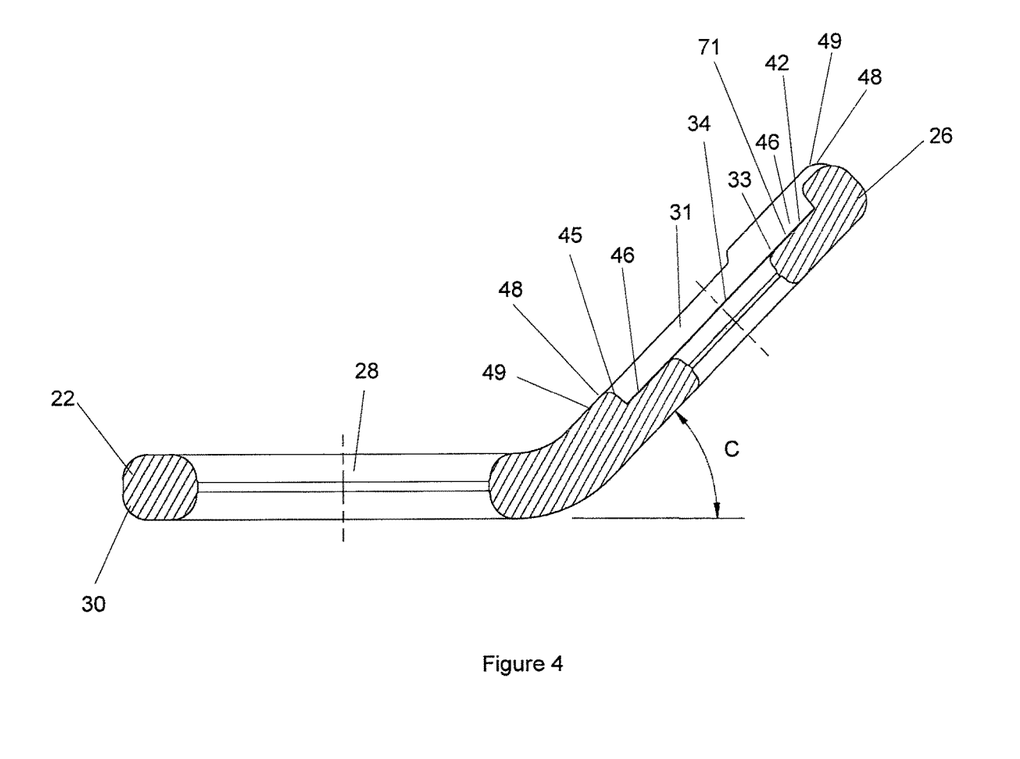
FIG. 4 is a sectional view illustrating section A-A of the anchor as shown in FIG. 3.
Figures 5, 6:
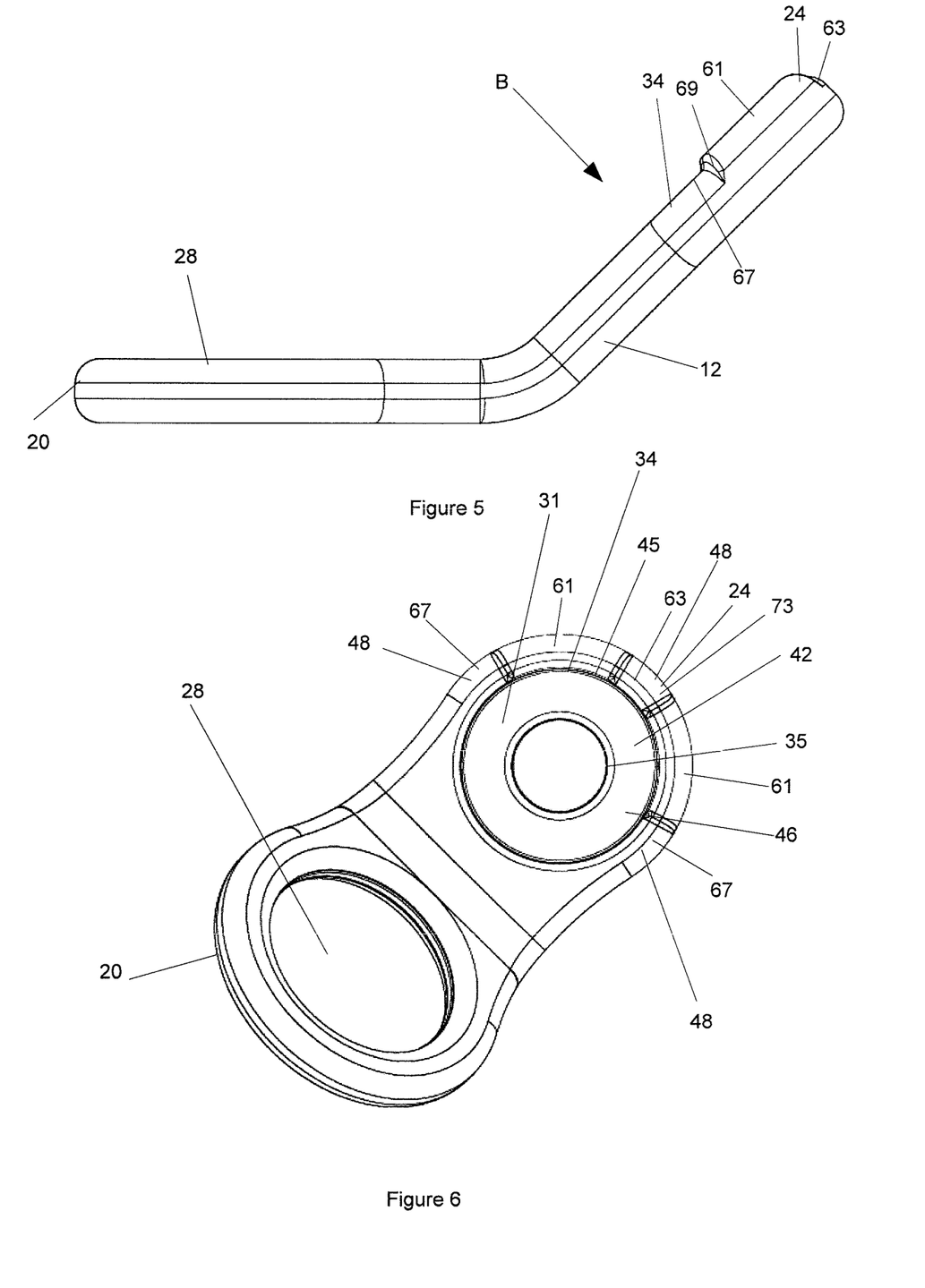
FIG. 5 is a side view illustrating the anchor.
FIG. 6 is a view illustrating the anchor from direction B as shown in FIG. 5.

Referring to FIGS. 2b, 2c and 2d, there is shown an example of the anchor system 1 including the anchor assembly 10 for coupling to the structure 14 in the form of a rock wall with the fastening arrangement 16 wherein the fastener 21 is a rock bolt 5. In this example, the anchor assembly 10 further includes a wall engaging levelling assembly 6 having a rock bolt plate 7 for fitting against the rock wall and a dome washer 9 fitted between the plate 7 and a rear surface 8 of the anchor body 12. The levelling assembly 6 providing a level surface over the rock face and being configured to allow a generally perpendicular and true engagement between the rock bolt and the second portion 24 of the anchor body 12 to which the nut 27 is engaged.

In more detail, and referring additionally to FIGS. 3 to 6, the first portion 20 is angled relative to the second portion 24 at an angle C (shown in FIG. 4) that may be in the range of about 20 to 60 degrees and preferably about 35 degrees. The first portion 20 includes a first aperture 28, which is preferably circular, defined in part by a rounded wall 30 that provides an attachment point or eyelet 32 to which the tether may be attached.

The second portion 24 includes an annular recess 31 with an aperture 34 dimensioned to receive the fastener 21 and be engaged, either directly or indirectly, by the securing part 25 in the form of the nut 27. The annular recess 31 is defined by a rounded skirting wall 45 and an annular recessed ledge 42 that provides a throat 43 of the aperture 34. The second portion 24 thereby providing an anchor point 35 for securing the anchor body 12 to the structure 14. The second portion 24 includes a rim section 37 that at least partially skirts the annular recess 31 radially outwardly of the rounded skirting wall 45.

Figure 7A:
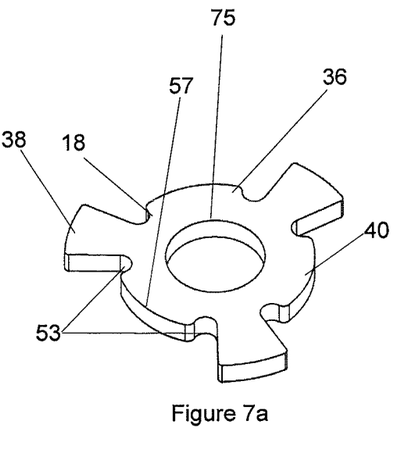
FIGS. 7a to 7c illustrates a deformable part in a pre-deformed condition.
Figure 7B:
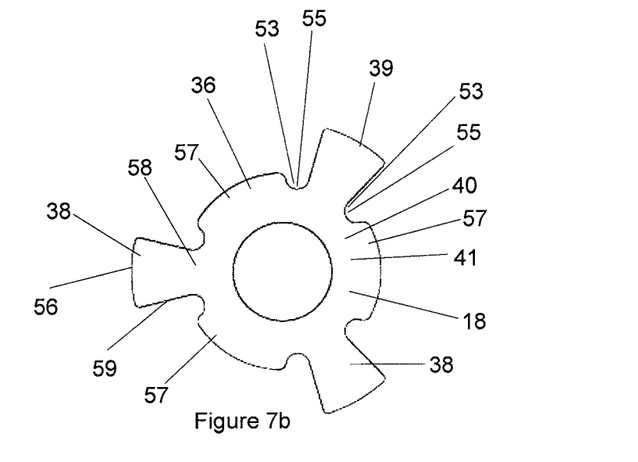
Figure 7C:
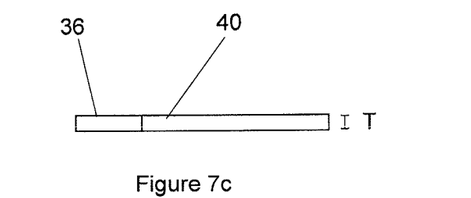

Referring additionally to FIGS. 7a to 7c and FIGS. 8a to 8c, the indicator 18 is provided in the form of a deformable part 36 in the form of an indicator washer 40, best shown in FIGS. 7a to 7c and FIGS. 8a to 8c, arranged to be engaged in a fitted condition between the nut 27 and the anchor body 12. The part 36 in the form of the washer 40 includes an annular body or body portion 41 and a deformable portion 38 being moveable between an initial non-deformed condition, as shown in FIGS. 7a to 7c and a deformed condition, as shown in FIGS. 1, 2 and 8a to 8c, in response to tightening of the nut 27 of the fastening arrangement 16. The annular body or body portion 41 includes an aperture 75 through which the fastener 21 passes in the fitted condition.

In this example, the deformable portion 38 is provided in the form of a plurality deformable tabs 39 extending radially of the annular body 41. The deformable tabs 39 are arranged to deform at a pre-determined load applied to the fastening arrangement 16.

The annular recessed ledge 42 includes a top surface 71 that provides a first or recessed seating surface 46 against which the annular body or body portion 41 of the indicator 18 bears or abuts in the deformed condition.

The rim section 37 includes a top or outward facing side 49 radially outwardly of the rounded skirting wall 45. The top or outward facing side 49 provides a second or bearing/abutment surface 48, elevated relative to the recessed seating surface 46. The bearing/abutment surface 48 and the recessed seating surface 46 may be or include surfaces that are generally parallel with one another thereby both general facing outwardly, away from the wall surface 14, in use.

The second or bearing surface 48 is arranged to engage with the deformable portion 38, more specifically the tabs 39, of the washer 40 as the annular body 41 of the washer 40 is drawn or urged by the nut 27, more specifically the standard washer 29, into abutment with the recessed surface 46. The second or bearing surface 48 may be formed from multiple sections recessed into the rim section 37 is further detailed below.

In this example, the rim section 37 includes at least one locator 73 arranged to located and inhibit rotation of the indicator washer 40 in at least one of the non-deformed and deformed conditions. The locator 73 may be provided by a notch or recess 63. The notch 63 may be defined between locating elevated portions or shoulders 61 toward or at the second end 26. The notch 63 is arranged to receive and locate one of the deformable tabs 39. The surface 65 of the notch 63 provides part of the bearing/abutment surfaces 48 against which the deformable tabs 39 bear in use.

The elevated locating portions or shoulders 61 extend circumferentially from opposing sides of the notch 63 around the top facing side 49 and terminate at shoulder ends 69 about a ¼ A of distance, from each side of the notch 63, around the top facing side 49. The shoulders 61 then lower to a surface 67 at the same level as the surface 65 of the notch 63. The other two deformable tabs 39 of the washer 40 are located by the shoulder ends 69 and bear on the surface 67 in use. The elevated portions or shoulders 61 and the notch 63 defined thereby assist to locate and inhibit rotation of the washer 40 in use.

It is noted that in some examples, the elevated portions or shoulders 61 may be omitted and the second bearing surface 48 may simply be provided by the continuous surface of the top facing side 49. However, without the notch 63 there may be some rotational slippage of the washer 40.

Figure 8A:
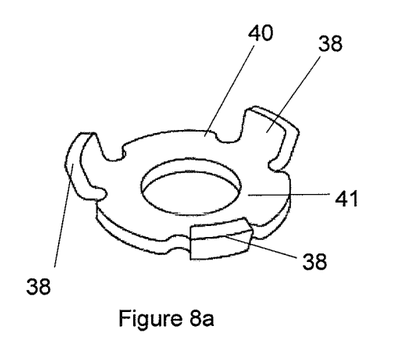
FIGS. 8a to 8c illustrates the deformable part in a deformed condition.
Figure 8B:
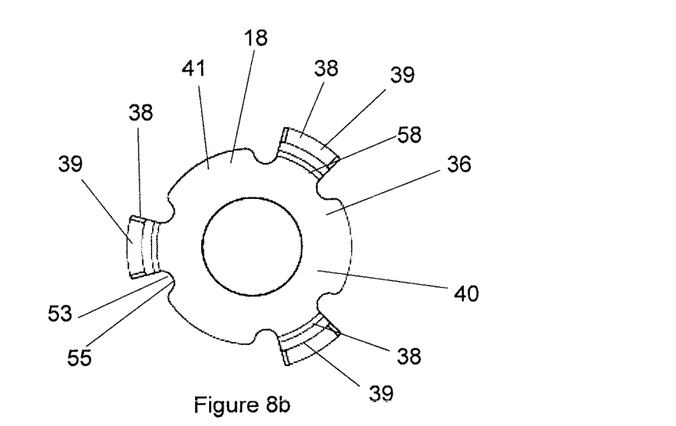
Figure 8C:
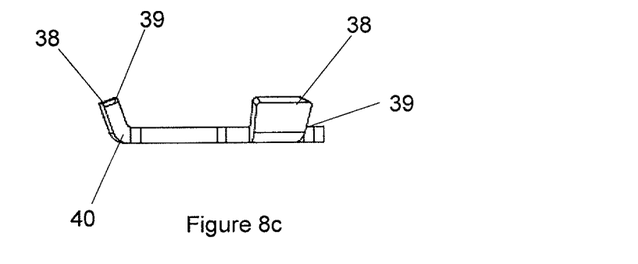
Figure 9A:
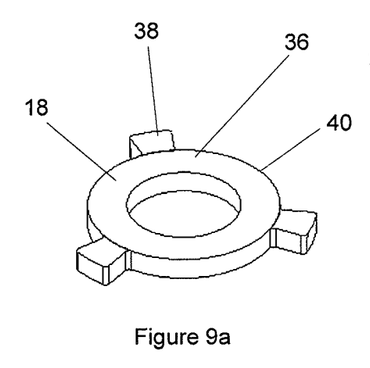
FIGS. 9a to 9c illustrates a second example of the deformable part in a pre-deformed condition.
Figure 9B:
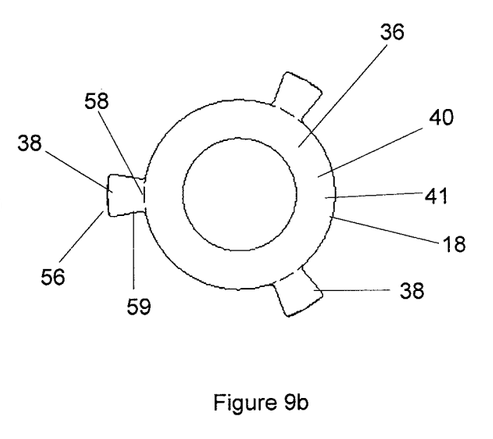
Figure 9C:
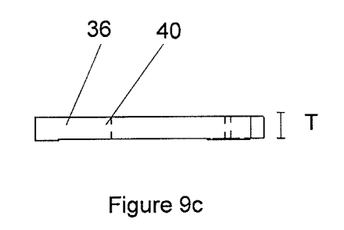
Figure 10A:
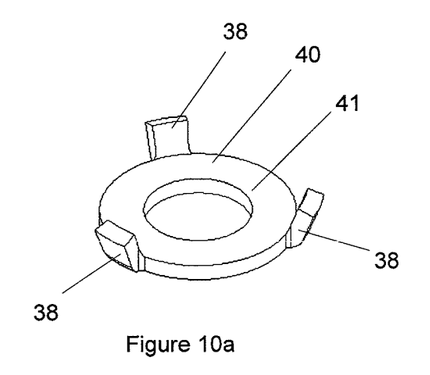
FIGS. 10a to 10c illustrates the second example of the deformable part in a deformed condition.
Figure 10B:
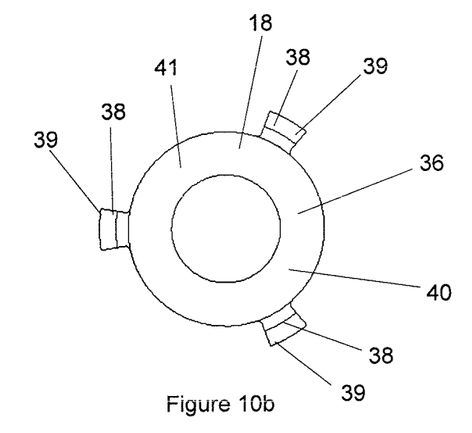
Figure 10C:
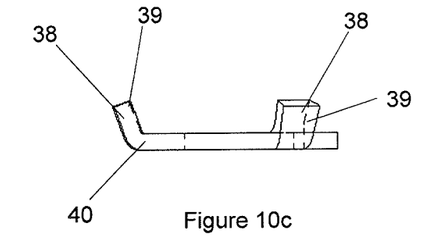

In use, the force between the second or bearing surfaces 48 and the deformable tabs 39 moves the deformable tabs 39 to the deformed condition as shown, for example, in FIGS. 8a to 8c. Accordingly, during deformation, the annular body 41 of the washer 40 is arranged to be drawn into and received by the annular recess 31 and with the deformable tabs 39 initially engaging the abutment surfaces 48 and then sliding to abutment with the skirting wall 45. Once the nut 27 is fully tightened, and the tabs 39 are deformed, the annular body 41 moves into abutment with the recessed seating surface 46.

The recess 31 is arranged such that there is a gap 47 (shown in FIG. 1), laterally, between the annular body 41 of the washer 40 and a skirting wall 45 of the recess 31 above annular recessed ledge 42 to provide clearance for the deformable tabs 39 extending from the annular body 41 of the washer 40. In the deformed condition, the deformable tabs 39 at least partially occupy the gap 47.

The standard washer 29 is also formed to be similar in dimension, or having a diameter similar, to the annular body 41 of the washer 40 such that the tabs 39, in the deformed condition, extend past or along the circumferential rim 51 (shown in FIG. 1) of the standard washer 29. The tabs 39 may bear on the circumferential rim 51 to capture the standard washer 29.

In this example, the bolt 23 may be a rock bolt such as an M24 rock bolt with the nut 27 with the standard washer 29 and indicator washer 40 being sized respectively. The anchor body 12 may be forged formed as a single component and may be formed from an Alloy Steel Grade 4140 or similar.

Turning to the indicator washer 40 in more detail and referring to FIGS. 7a to 7c and 8a to 8c, in this example, the deformable tabs 39 are provided in the form of three equidistant tabs 39 located circumferentially around and extending from the annular body 41. The tabs 39 include a slightly wider free end 56 and narrow toward bases 58 thereof. The side edges or junction 59 between the bases 58 and the annular body 41 may include a radius 53 to assist with stress distribution during the deformation process. In this example, the radius 53 is relatively pronounced so as to provide nooks 55 on opposing sides of the bases 58 of the tabs 39. This lengthens the tabs 39. Between the nooks 55 of opposing tabs 39, the annular body 41 of the washer 40 returns to its diameter so as to provide radial segments 57 that are received by the annular recess 31 and become seated on the recessed surface 46 thereof in use. The bases 58 of the tabs 39 thereby being inwardly radially located relative to the radial segments 57. This allows the bending of the tabs 39 radially inwardly relative to the radial segments 57 to assist with the tabs 39 being bent and drawn into the recess 31 in use and become located within the gap 47.

The number of tabs 39 and the thickness "T" of the washer 40 may be varied such that the tabs 39 move from the non-deformed condition to the deformed condition with varying loads applied to the fastening arrangement 16. For example, more tabs 39 may be added to increase the deformation load or the thickness of the washer 40 and/or tabs 39 may be increased to achieve similar results. The material selection will of course have similar effects. The load thereby being set by the configuration of the washer 40 and being predetermined or pre-set for a particular anchor assembly 10.

By way of example only, in this example, the thickness "T" of the indicator washer 40 may be in the range of about 2 mm to 4 mm, preferably 3 mm and the material may be a medium strength structural steel plate product with nominal yield strength of 250 MPa (referred to as Grade 250 Steel plate or sheet). In this example, the overall outer diameter of the washer 40, between the free ends 56, may be about 75 to 80 mm, the diameter between the bases 58 of the tabs 39 may be about 45 to 50 mm and diameter of the aperture 75 may be around 25 mm. Of course, other materials and dimensions may be employed to achieve the same functionality.

It is noted that the tabs 39 of the indicator washer 40 undergo plastic deformation (or irreversible deformation) as the metal material is bent past its yield point. Accordingly, one deformed, the indicator washer 40 retains its deformed shape and is therefore easily identified as a "used part" and may be replaced on a periodic basis.

In this example, the tabs 39 are configured to deform at a pre-determined load of about 21 to 22 kN. This load may be applied via the fastening arrangement 16. This provides a safety validation and a visual indication that anchor assembly 10 is able to withstand a withdrawal force of about 22 kN which is considered "fit for purpose" for use in connecting a tether to the anchor assembly 10. The tether may then be connected to personal protective equipment of a person. Other force ratings may also be provided, for example, 15 kN may be utilised for a single person anchor.

In some examples, the anchor assembly 10 may also include visual indicia such as colour coding to be associated with different load ratings and/or indicating when safety checks have been completed. For example, the anchor body 12 may be a green colour to indicate a load rating of about 22 kN. Textural load indicia may also be utilised.

The indicating washer 40 may also include further visual indicia such as being formed in multiple colours to indicate a safety time period. For example, the indicating washer 40 may be coloured red if being in service in a first time period between, say, the months of January to March and, say, the indicating washer 40 may be coloured blue in a second time period from the months of April to June. Therefore, a user or safety person knows that a red indicating washer 40 associated with the first time period is not fit for use in the second time period and needs to be checked and replaced with a new blue washer.

This provides a further safety measure to ensure that the anchor assembly 10 has not only been load tested to a pre-defined threshold load (in this example 22 kN) but also has a time based visual safety indicator system to ensure the regular inspection and changing of the anchor assembly 10. The system may include anchor bodies 12 and washers 40 of various colours, fastening arrangements 16, carabiners 13, tethers and personal protective equipment thereby providing a complete fall arrest system having visual load indicators and time based visual safety indicators.

Referring now to FIGS. 9a to 9c and 10a to 10c, a second example of the washer 40 is shown and like numerals denote like parts. In this example, the radius 53 on opposing sides of the bases 58 of the tabs 39 is less pronounced with the bases 58 being generally in line with the outer diameter of the annular body 41. Consequently, the diameter of the annular body 41 between the tabs 39 is more continuously in comparison to the diameter of the annular body 41 of the washer 40 shown in the first example. The tabs 39 in this second example are also relatively shorter. The remaining features of this second example of the washer 40 are substantially similar to that of the first example and are not again described here.

In a method of use, the anchor assembly 10 may be secured to a structure 14 such as a rock wall by fitting the fastening arrangement 16 to the anchor body 12. The indicator 18, provided here in the form of an indicator washer 40, is initially located over the recess 31 of the anchor body 12 and urged by the advancement, via user actuation, of the nut 27 into the recess 31. The tabs 39 may then be placed on or aligned with the bearing surfaces 48 of the top side 49 of the rim section 37. More specifically, in this example, one of the tabs 39 may be aligned with and received by the notch 63 and seated on the bearing surface 65 thereof that provide bearing surfaces 48. This locates the indicator washer 40 and inhibits rotation of the washer 40 relative to the nut 27. The other tabs 39 may be seated on the bearing surfaces 67, which also provide bearing surfaces 48, beyond the elevated or shoulder portions 61.

The tabs 39, which are stopped and bear on bearing surfaces 48 of the top side 49 are then deformed such that tabs 39 point away from the annular body 41 of the washer 40 and outwardly of the recess 31. The gap 47 providing clearance for the tabs 39 that then are located between the standard washer 29 and the skirting wall 45 of the recess 31. Because the tabs 39 are configured to deform at a pre-determined load, the user actuating the nut 27 is provided with a visual means to identify that the pre-determined load has been applied to the fastening arrangement 16. Once deformed indicator 18 remains deformed.

The method of use may also include fitting the anchor assembly 10 with the anchor body 12 or the indicator 18 having load capacity or time bases indicia such as colour coding as has been above described. In particular, the method of use, may include associating a particular colour of the indicator 18 with a particular time period, and then replacing that indicator 18 with a new indicator 18 having another particular colour associated with a second or later time period.

Advantageously, there has been described an anchor for use with an indicator washer and fastening arrangement to provide an anchor assembly that provides visual indication, via the deformed tabs of the washer, that the anchor assembly has had a pre-determined load applied to the fastening arrangement to ensure the anchor assembly is able to support the required load and is therefore fit for use. The indicator thereby enabling in-situ testing and indication to ensure safety of the anchor assembly. It is also noted that the indicator undergoes plastic or irreversible deformation in the deformed condition so that the indicator may be easily identified as a "used part" and not inadvertently reused.

The anchor assembly may also be supplied with colour coded anchor bodies and/or indicator washers that relate to the rated load. The colour code may also relate to time periods of use to ensure the regular inspection, testing and replacement of the anchor assembly or parts thereof. The anchor assembly may therefore be provided as a system or kit having coloured parts or the like, and also may include other parts such as carabiners, tethers and related person protective equipment.

Further advantageously, the fall arrest system and the anchor assembly discussed here are formed from relatively few, robust and cost effectively manufacturable components. The anchor and indicator being both formed from metal materials so as to provide longevity as well as predicable and repeatable load bearing capacity.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The claims defining the invention are as follows:

1. An anchor assembly for coupling a tether to a rock structure in a fitted condition with a fastening arrangement having a rock bolt and a nut arranged to advance on the rock bolt, the anchor assembly including:
    an anchor body having a first portion located toward a first end adapted to couple with the tether and a second portion located toward a second end, the second portion having an aperture adapted to receive the rock bolt; and
    an indicator arranged to be engagable in the fitted condition between the fastening arrangement and the anchor body, the indicator including a flat annular body portion dimensioned to be urged by the nut and a plurality of deformable tabs extending radially from the annular body portion, the plurality of deformable tabs being adapted to deform relative to the annular body portion in a deformed condition;
    wherein the second portion of the anchor body includes a recess in which the annular body portion of the indicator is receivable, the recess having a flat annular ledge dimensioned to be engageable with the annular body portion, and a rim section elevated relative to the annular ledge that at least partially skirts the recess so as to be engageable with the plurality of deformable tabs, and
    wherein, the anchor assembly is adapted to be moveable between an initial condition, in which the indicator is arranged to span the recess with the plurality of deformable tabs seated on the rim section and the annular body portion is spaced apart from and over the annular ledge, and
    the fitted condition in which the nut is advanced against the annular body portion to apply a withdrawal load to the rock bolt and move the indicator to the deformed condition upon exceeding a pre-defined threshold of the withdrawal load in which the annular body portion is moved within the recess so as to be engagable with the annular ledge and the plurality of deformable tabs are deformed thereby indicating the pre-defined threshold of the withdrawal load has been exceeded.

2. The anchor assembly according to claim 1, wherein the rim section is adapted to inhibit rotation of the indicator in at least one of the initial and deformed conditions.

3. The anchor assembly according to claim 1, wherein the rim section is arranged to receive one or more of the plurality of deformable tabs thereby locating the indicator.

4. The anchor assembly according to claim 1, wherein bases of the plurality of deformable tabs are located radially inwardly relative to an outer diameter of the annular body portion of the indicator.

5. The anchor assembly according to claim 1, wherein the annular body portion of the indicator includes a flat bearing surface skirting the aperture arranged to be urged, either directly or indirectly, by the nut.

6. The anchor assembly according to claim 1, wherein the recess is arranged to receive the nut in the fitted condition with the plurality of deformable tabs extending radially beyond the nut.

7. The anchor assembly according to claim 1, wherein the anchor assembly further includes the fastening arrangement.

8. The anchor assembly according to claim 1, wherein bases of the plurality of deformable tabs are narrower than free ends tips of the plurality of deformable tabs.

9. The anchor assembly according to claim 1, wherein the first portion of the anchor body is angled related to the second portion of the anchor body.

10. The anchor assembly according to claim 1, wherein the anchor assembly further includes a levelling assembly having a plate arranged to fit against the rock structure and a dome washer arranged to be fitted between the plate and a rear surface of the anchor body.

11. The anchor assembly according to claim 1, wherein the anchor assembly further includes a levelling assembly having a plate arranged to fit against the rock structure and a dome washer arranged to be fitted about the rock bolt between the plate and a rear surface of second portion of the anchor body.

12. The anchor assembly according to claim 1, wherein a flat washer is located between the nut and the indicator.

13. The anchor assembly according to claim 1, wherein the first portion includes an aperture for coupling with the tether.

14. The anchor assembly according to claim 1, wherein the plurality of deformable tabs includes three or more equally spaced tabs.

15. The anchor assembly according to claim 1, wherein the rim section includes at least one notch to locate at least one of the pluralities of deformable tabs.

16. The anchor assembly according to claim 1, wherein the recess is arranged such that there is a gap, laterally, between the annular body of the washer and a skirting wall of the recess to provide clearance for the plurality of the deformable tabs in the deformed condition.

* * * * *